United States Patent
Chamberlin (10) Patent No.: US 9,065,169 B2
(45) Date of Patent: Jun. 23, 2015

(54) HIGH FREQUENCY MAGNETIC FIELD ANTENNA

(71) Applicant: University of New Hampshire, Durham, NH (US)

(72) Inventor: Kent A. Chamberlin, Durham, NH (US)

(73) Assignee: University of New Hampshire, Durham, NH (US)

( * ) Notice: Subject to any disclaimer, the term of this patent is extended or adjusted under 35 U.S.C. 154(b) by 81 days.

(21) Appl. No.: 13/926,161

(22) Filed: Jun. 25, 2013

(65) Prior Publication Data

US 2014/0378080 A1 Dec. 25, 2014

(51) Int. Cl.
*H04B 1/16* (2006.01)
*H01Q 7/06* (2006.01)
*H04B 1/06* (2006.01)

(52) U.S. Cl.
CPC ... *H01Q 7/06* (2013.01); *H04B 1/06* (2013.01)

(58) Field of Classification Search
USPC .................. 343/702, 718, 748; 455/63.4, 269
See application file for complete search history.

(56) References Cited

U.S. PATENT DOCUMENTS

| | | | |
|---|---|---|---|
| 3,736,591 A * | 5/1973 | Rennels et al. | 343/702 |
| 3,778,836 A | 12/1973 | Tanaka | |
| 3,823,403 A * | 7/1974 | Walter et al. | 343/708 |
| 4,940,992 A * | 7/1990 | Nguyen et al. | 343/803 |
| 6,215,455 B1 | 4/2001 | D'Angelo et al. | |
| 6,622,007 B2 | 9/2003 | Linden | |
| 6,731,246 B2 | 5/2004 | Parsche et al. | |
| 7,053,857 B2 | 5/2006 | Noro et al. | |
| 7,242,359 B2 * | 7/2007 | Turner et al. | 343/742 |
| 7,737,905 B1 * | 6/2010 | Meloling et al. | 343/788 |
| 7,969,373 B2 | 6/2011 | Tsilioukas et al. | |
| 8,436,780 B2 | 5/2013 | Schantz et al. | |
| 8,736,500 B1 * | 5/2014 | Lam | 343/726 |
| 8,860,618 B2 * | 10/2014 | Gertenbach et al. | 343/745 |
| 2003/0227572 A1 | 12/2003 | Rowser et al. | |
| 2006/0038731 A1 * | 2/2006 | Turner et al. | 343/742 |
| 2007/0024516 A1 * | 2/2007 | Araki et al. | 343/788 |
| 2009/0121949 A1 | 5/2009 | Washiro | |
| 2009/0254961 A1 | 10/2009 | Aue | |
| 2009/0322634 A1 | 12/2009 | Yun et al. | |
| 2011/0128199 A1 | 6/2011 | He et al. | |
| 2012/0169553 A1 | 7/2012 | Nomura et al. | |
| 2012/0229354 A1 | 9/2012 | Ishikura et al. | |
| 2013/0176094 A1 * | 7/2013 | Hong et al. | 336/107 |

OTHER PUBLICATIONS

Chamberlin, K. and McMahon, B., Datacasting in the Mobile Environment, Journal of Networks, Jul. 2008, pp. 49-55, vol. 3, No. 7, Academy Publisher, Tortola, British Virgin Islands.

(Continued)

*Primary Examiner* — Blane J Jackson
(74) *Attorney, Agent, or Firm* — Lizotte Law Office, PLLC; Donna L. Lizotte (57) ABSTRACT

An antenna system including a loop antenna including a conductor; and a magnetic gain element positioned in an aperture defined by the loop antenna, the magnetic gain element including a magnetic material that has a relative permeability greater than one for an operating frequency range, the magnetic gain element configured to increase a magnetic flux density associated with a received magnetic-field component of an incident electromagnetic wave wherein a loop output voltage induced in the loop antenna is based, at least in part, on the increased magnetic flux density.

14 Claims, 3 Drawing Sheets

(56) References Cited

OTHER PUBLICATIONS

Chamberlin, K., Kun, A., Valcourt and S. McMahon, B., Measurement of Propagation Effects for High-Speed, Digital UHF Channels, IEEE Antennas & Propagation Society International Symposium, Jun. 9-15, 2007, pp. 2001-2004, IEEE, New Jersey.

Chamberlin, K., Valcourt, S., Kun, A. and McMahon, B., Evaluation of Datacasting in the Mobile Environment, 2007 IEEE 66th Vehicular Technology Conference, Sep. 30, 2007-Oct. 3, 2007, pp. 159-163, VTC-2007 Fall, IEEE, New Jersey.

Pettengill, R.C., Garland, H.T. and Meindl, J.D., Receiving Antenna Design for Miniature Receivers, IEEE Transactions on Antennas and Propagation, Jul. 1977, pp. 528-530, vol. 25, issue 4, IEEE, New Jersey.

Smith, G.S., Chapter 5: Loop Antennas, Antenna Engineering Handbook, Fourth Edition, May 18, 2007, pp. 5-1 through 5-25, McGraw-Hill, United States.

Simpson, T.L., Designing an Electrically Small Ferrite-Loaded Loop Antenna for Optimum Performance, 2007 IEEE Antennas and Propagation Society International Symposium, Jun. 9-15, 2007, pp. 5427-5430, IEEE, New Jersey.

Valcourt, S., Datla, P., Chamberlin, K. and McMahon, B., Information Integration for Public Safety Officers, Proceedings of the SPIE 6943, Sensors, and Command, Control, Communications and Intelligence (C3I) Technologies for Homeland Security and Homeland Defense VII, 69430M, Apr. 16, 2008, SPIE, Bellingham, Washington.

Valcourt, S., Datla, P., Chamberlin, K. and McMahon, B., Using Two-Way Datacasting to Deliver Real-Time Public Safety Information, Proceedings of 2008 IEEE Conference on Technologies for Homeland Security, May 2008, pp. 117-122, IEEE, New Jersey.

Valcourt, S., Chamberlin, K., McMahon, B. and Kun, A., Systems Engineering of Datacasting for Public Safety Vehicles, Proceedings of 2007 IEEE Conference on Technologies for Homeland Security, May 2007, pp. 45-50, IEEE, New Jersey.

McMahon, B., Computer Modeling Analysis of Broadband Mobile Antennas, Thesis, University of New Hampshire, May 2008, Durham, New Hampshire.

* cited by examiner

HIGH FREQUENCY MAGNETIC FIELD ANTENNA

STATEMENT REGARDING FEDERALLY SPONSORED RESEARCH OR DEVELOPMENT

This invention was made with government support under Contract Number 116088 awarded by the National Institute of Justice. The government has certain rights in the invention.

CROSS-REFERENCE TO RELATED APPLICATIONS

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC

Not applicable

BACKGROUND

1. Field of the Disclosure

This disclosure relates to a magnetic field antenna, in particular to a high frequency magnetic field antenna.

2. Description of Related Art

Digital television (DTV) utilizes broadcast television channel frequencies that historically were utilized for analog television channels. For example, VHF channels utilize frequencies in the range 54 MHz to 216 MHz while UHF channels utilize frequencies in the range 470 MHz to 890 MHz. Each channel occupies a band of frequencies known as channel bandwidth. While a single analog television program occupied one channel bandwidth, encoding techniques utilized in digital television allow programming multiple digital subchannels ("multicasting") and/or data within a single channel bandwidth.

The data included in a channel bandwidth may or may not be related to a television program. For example, "Datacasting" is the term used to describe the transmission of data unrelated to a television program that can be encoded into excess bandwidth associated with digital television signals. The excess bandwidth provides for data rates of about 2 Mb/sec and the data can be retrieved within a television station coverage area. Thus, Datacasting may be utilized to transmit data using digital television signals.

Mobile receivers may be configured to receive one or more television channels and to provide television program content and/or data to a user or user device. For example, mobile receivers may be included in or on a user vehicle (e.g., automobile), in a user device and/or coupled to a user device, e.g., computer (laptop, portable, tablet) and/or smart phone. Mobile receivers may be coupled to or may include a receive antenna configured to capture the transmitted television signal and to provide a corresponding electrical signal to the mobile receiver. Desirable characteristics of antennas used in the mobile environment include, but are not limited to a small form factor, broadband operating frequency range, receive pattern isotropic in the azimuthal plane and being physically durable.

The trend for broadcast television is to radiate only a horizontally-polarized signal rather than one that has been typically elliptically polarized. An antenna configured to capture an elliptically polarized electromagnetic wave (e.g., a television signal) may not necessarily capture a horizontally polarized electromagnetic wave. For example, a whip antenna (i.e., an electric field dipole antenna) that is typically oriented vertically may efficiently capture an elliptically polarized electromagnetic wave but may not reliably capture a horizontally polarized electromagnetic wave. Reliable capture generally requires capturing enough of an incident electromagnetic wave to produce a usable output. Since a whip antenna is vertically oriented, it is considered cross-polarized relative to an electric-field component of a horizontally polarized electromagnetic wave. In order to reliably receive a horizontally polarized electromagnetic wave (e.g., a digital television signal), an electric field antenna should be co-polarized, i.e., should be horizontally oriented. While horizontally oriented electric field antennas configured for mobile applications exist, they are relatively large (having a diameter or width between approximately 14 and 22 inches). Because of their size, they can be difficult to mount, are not suitable for handheld applications and may be insufficiently robust physically, e.g., may be frangible.

Television signals, as electromagnetic waves, include an electric-field component and a magnetic-field component. Thus, an alternative to using an electric field antenna to capture the electric-field component may be to capture the magnetic-field component using a magnetic field antenna such as a loop antenna. For example, some AM radio antennas are loop antennas configured to capture the magnetic-field component of a transmitted AM radio signal. For broadband reception, a loop antenna is configured to be electrically small with a circumference that corresponds to some fraction of a wavelength of a maximum operating frequency. For the AM band (531 kHz to 1.710 MHz), the maximum operating frequency is 1.710 MHz. For higher frequencies, the loop size is smaller since the loop circumference depends on the maximum operating frequency. The output voltage of a loop antenna corresponds to the captured magnetic-field component of a received electromagnetic wave and is proportional to loop size. Thus, a smaller loop size corresponds to a smaller output voltage.

The output voltage produced by a loop antenna may be increased (i.e., gain) by adding turns and/or wrapping the loop antenna around a ferrite material. Use of these techniques has been generally limited to relatively low frequencies, e.g., the AM radio band. Adding turns increases the inductance of the loop antenna. At higher frequencies, the increased inductance results in an extremely large antenna output impedance, thereby making coupling highly inefficient. Further, the increased inductance can lead to resonant behavior within the operating frequency range, negating wideband performance of a loop antenna. The ferrite material is configured to provide gain to the loop antenna and the amount of the gain is based, at least in part, on magnetic properties of the ferrite material. However, these magnetic properties are frequency dependent and, historically, ferrite materials had poor magnetic properties at higher frequencies thereby providing no gain at higher frequencies.

SUMMARY

The present disclosure relates in one embodiment to an antenna system. The antenna system comprises a loop antenna comprising a conductor; and a magnetic gain element positioned in an aperture defined by the loop antenna, the magnetic gain element comprising a magnetic material that has a relative permeability greater than one for an operating frequency range, the magnetic gain element configured to increase a magnetic flux density associated with a received magnetic-field component of an incident electromagnetic wave wherein a loop output voltage induced in the loop antenna is based, at least in part, on the increased magnetic flux density.

The present disclosure relates in another embodiment to a method. The method comprises increasing a magnetic flux density associated with a received magnetic-field component of an incident electromagnetic wave using a magnetic gain element positioned in an aperture defined by a loop antenna, the magnetic gain element comprising a magnetic material that has a relative permeability greater than one for an operating frequency range; and inducing a loop output voltage in the loop antenna based, at least in part, on the increased magnetic flux density.

The present disclosure relates in another embodiment to a system comprising a receiver coupled to an antenna system. The antenna system comprises a loop antenna comprising a conductor, and a magnetic gain element positioned in an aperture defined by the loop antenna, the magnetic gain element comprising a magnetic material that has a relative permeability greater than one for an operating frequency range, the magnetic gain element configured to increase a magnetic flux density associated with a received magnetic-field component of an incident electromagnetic wave, wherein a loop output voltage induced in the loop antenna is based, at least in part, on the increased magnetic flux density and the receiver is configured to receive an input signal related to the loop output voltage.

DETAILED DESCRIPTION

Generally, this disclosure describes a high frequency magnetic field antenna system and method. The magnetic field antenna system and method are configured to have a wide band operating bandwidth (e.g., on the order of hundreds of megahertz (MHz)) and to be isotropic in at least one plane. An antenna system consistent with the present disclosure includes a loop antenna and a magnetic gain element positioned in an aperture (i.e., opening) defined by the loop antenna. The magnetic gain element includes a magnetic material with a relative permeability greater than one (i.e., greater than unity) over the operating frequency range of the antenna system. A circumference of the loop antenna is configured to be electrically small with respect to a wavelength of a maximum operating frequency thereby providing wide band operation. A magnetic field loop antenna with the electrically small loop circumference may be considered a dual of a Hertzian dipole, electric field antenna.

The operating frequency range of the high frequency magnetic field antenna consistent with the present disclosure generally includes frequencies greater than or equal to 50 MHz. In some embodiments, the operating frequency range may include operating frequencies in the range of 50 MHz to 1 GHz. In some embodiments, the operating frequency range may include the VHF and UHF frequency bands, i.e., may include operating frequencies in the range 54 MHz to 890 MHz. The operating frequency range is based, at least in part, on the frequency range over which the relative permeability of the magnetic material is greater than one (i.e., greater than unity).

An antenna system consistent with the present disclosure is configured to capture a magnetic-field component of an incident electromagnetic wave with a frequency included in the operating frequency range. In an embodiment, a magnetic field antenna system consistent with the present disclosure is configured to capture one or more digital television signals. In an embodiment, a magnetic field antenna system consistent with the present disclosure is configured to capture one or more Datacast signals. Since the digital television signals may typically be horizontally polarized, the associated magnetic field may be vertically oriented. In these embodiments, the loop antenna is configured to be oriented so that a loop axis (perpendicular to a plane of the loop) is oriented parallel to the vertical axis. The antenna system may then be isotropic in the azimuthal plane.

The magnetic gain element is configured to increase a magnetic flux density associated with a received magnetic field intensity. The increased magnetic flux density input to the loop antenna may then induce a voltage in the loop antenna ("loop output voltage"). An electrical signal corresponding to the loop output voltage may then be provided to a receiver.

In some embodiments, the antenna system may include an amplifier configured to amplify the loop output voltage or a current related to the loop output voltage prior to transmission to the receiver. The amplifier is configured to be coupled to antenna feed terminals and physically positioned close to the loop antenna. The positioning is configured to reduce noise effects and to better match a feed-point impedance of the antenna. The amplifier may be configured to provide an output impedance that corresponds to (e.g., matches) a characteristic impedance of a transmission line configured to carry the amplified loop output from the amplifier to the receiver.

Thus, a magnetic field antenna system consistent with the present disclosure is configured to receive the magnetic-field component of an incident electromagnetic wave and to be isotropic in at least one plane. When positioned so that the loop axis is vertically oriented, a magnetic field antenna system consistent with the present disclosure is configured to receive the magnetic-field component of a horizontally polarized electromagnetic wave and to be isotropic in the azimuthal plane (i.e., is not sensitive to direction of arrival) thereby facilitating its use in a mobile environment. The antenna system is configured to have a minimum operating frequency greater than or equal to 50 MHz. The antenna system is configured to be wide band, e.g., with an operating frequency range that includes the VHF and/or UHF frequency bands. The magnetic gain element is configured to improve reception of the magnetic-field component of an incident electromagnetic wave by increasing the magnetic flux density available to the loop antenna from the incident magnetic-field component through use of a magnetic material with a relative permeability greater than one over the operational frequency range. A magnetic field antenna consistent with the present disclosure has a smaller form factor and may be relatively more robust, particularly in a mobile environment, than an electric field antenna configured to receive similar horizontally polarized electromagnetic waves.

Figure 1:
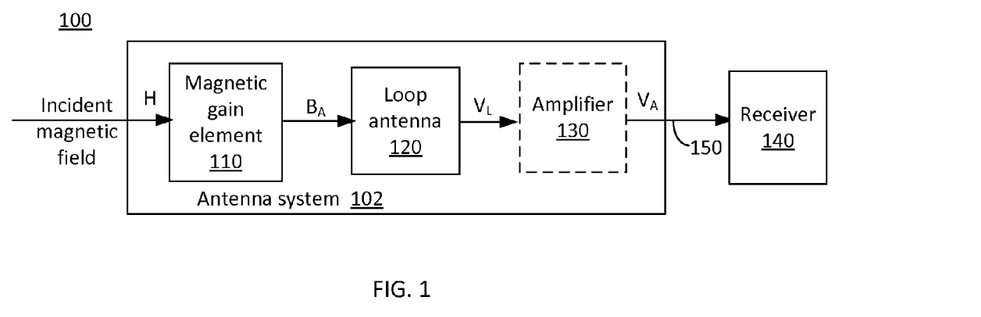
FIG. 1 illustrates a functional block diagram of an antenna system consistent with the present disclosure.

FIG. 1 illustrates a functional block diagram 100 of an antenna system 102 consistent with the present disclosure. The antenna system 102 includes a magnetic gain element 110 coupled to a loop antenna 120. In some embodiments, the antenna system 102 may include an amplifier 130 coupled to the loop antenna 120. The antenna system 102 is configured to receive a time varying incident electromagnetic wave and to capture at least a portion of an associated incident magnetic field. The antenna system 102 is configured to provide an output signal (e.g., an output voltage and/or output current) related to the captured incident magnetic field to a receiver 140. In some embodiments, the receiver 140 may be coupled to the antenna system 102 by a transmission line 150 that has a characteristic impedance. The receiver 140 is configured to receive the output signal for further processing. In some embodiments, the receiver 140 may include or be coupled to an amplifier.

The magnetic gain element 110 is configured to receive an incident magnetic field, H, and to increase the associated magnetic flux density, B. The magnetic gain element 110 includes a magnetic material with relative permeability greater than one (i.e., greater than unity) for the operating frequency range of antenna system 102. Magnetic flux density is defined as:

$$B = \mu H$$

where H is magnetic field intensity (ampere/meter) and $$\mu = \mu_r \mu_0$$

where $\mu_r$ is relative permeability and $\mu_0$ is the permeability of free space ($4\pi \times 10^{-7}$ newtons/ampere$^2$ (i.e., Henrys/meter)). In free space, $\mu = \mu_0$ so that the magnetic flux density in free space is $B_0 = \mu_0 H$ for incident magnetic field H. In the magnetic gain element, $\mu = \mu_r \mu_0$ and $\mu_r$ is greater than one, thus, the magnetic flux density associated with the magnetic gain element, $B_A$, is greater than $B_0$ by a factor of $\mu_r$ for the same incident magnetic field H, i.e. $B_A = \mu_r \mu_0 H = \mu_r B_0$.

Relative permeability is generally complex having a real part and an imaginary part. The real part generally affects the gain provided by the magnetic material and the imaginary part relates to losses in the magnetic material that may reduce the gain. As used herein, $\mu_r$ is real and refers to the real part of a complex relative permeability or non-complex (i.e., real) relative permeability. The complex relative permeability of a magnetic material may be frequency dependent over at least a portion of the operating frequency range. Magnetic properties of a magnetic material may be characterized by the real part and the imaginary part of the complex relative permeability and/or by the real part and a loss tangent defined as the ratio of the imaginary part to the real part, over a range of frequencies. Advantageously, advances in materials science have yielded magnetic materials with complex, frequency-dependent relative permeabilities that have a real part greater than one and a relatively small loss tangent for relatively high frequencies, e.g., operating frequencies greater than or equal to 50 MHz, and in some cases for frequencies on the order of 1 GHz. A maximum operating frequency of an antenna system consistent with the present disclosure may be determined based, at least in part, on frequency characteristics of the complex relative permeability associated with the magnetic material included in the magnetic gain element.

For example, a Nickel-Zinc ferrite material ("N40") available from Ceramic Magnetics, Inc., Fairfield, N.J., has a relative permeability greater than one for frequencies greater than 100 MHz. In another example, ceramic SMMDF201 series material, available from Spectrum Magnetics, Wilmington, Del., has relative permeability greater than one over the frequency range of 100 MHz to 1 GHz. It is contemplated that one or more of these materials may be utilized in a magnetic gain element consistent with the present disclosure.

Thus, the magnetic gain element provides a permeability-induced gain ("magnetic gain"), increasing the magnetic flux density available to the loop antenna 120 from the incident magnetic field intensity, H. An increased magnetic flux density may increase the likelihood of usable output from antenna system 102 to the receiver 140.

The loop antenna 120 is configured to generate a loop output voltage, $V_L$, based, at least in part, on the increased magnetic flux density, $B_A$, associated with the magnetic gain element 110. In other words, the loop output voltage $V_L$, based, at least in part, on the increased magnetic flux density, $B_A$, may be induced in the loop antenna. The magnetic gain element 110 is configured to be positioned in an aperture defined by the loop antenna 120. The loop output voltage may be detected at loop antenna terminals, as will be described in more detail below. The loop output voltage is related to magnetic flux density and antenna geometry by Faraday's law. Faraday's law relates a time varying incident magnetic flux density enclosed by a loop to a voltage induced in the loop:

$$V = \oint \vec{E} \cdot \vec{dl}$$
$$= -\frac{\partial}{\partial t} \int\int \vec{B} \cdot \vec{dS}$$
$$= -\frac{\partial}{\partial t} \int\int \mu \vec{H} \cdot \vec{dS}$$
$$= -\mu \frac{\partial}{\partial t} \int\int \vec{H} \cdot \vec{dS}$$

where V is induced voltage, B is magnetic flux density, H is magnetic field intensity, S is the surface bounded by the loop, and μ is the permeability of the area enclosed by the loop. It should be noted that μ may be taken outside the integral if it is homogeneous over the surface. Thus, the loop output voltage $V_L$ for antenna system 102 that includes magnetic gain element 110 and loop antenna 120 is increased by a factor of $\mu_r$ compared to a loop antenna of similar area without a magnetic gain element for the same incident magnetic field H (assuming an area of the magnetic gain element 110 is approximately equal to the area of the loop). Generally, the area of the magnetic gain element 110 may be less than or equal to the area of the loop with the difference corresponding to an area of insulating material that may separate a loop antenna conductor from the magnetic gain element. The difference may be relatively small for relatively thin insulating material, e.g., having a thickness in a range of 5 μm to 10 μm.

Thus, a magnetic gain element that includes a magnetic material with relative permeability greater than one for a desired frequency band, e.g., operating frequency range, is configured to increase the magnetic flux density and the induced voltage at the output terminals of the antenna system. In other words, the magnetic gain element is configured to provide a permeability-induced gain by exploiting a magnetic material that has a relative permeability greater than one over the operating frequency range.

Figures 2A, 2B:
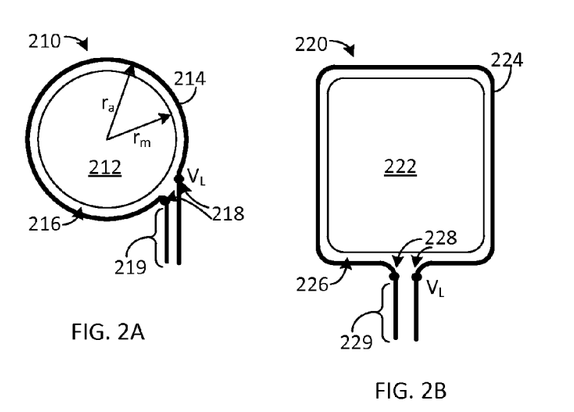
FIGS. 2A, 2B and 2C illustrate top views of example loop antenna-magnetic gain element geometric configurations consistent with various embodiments of the present disclosure.
Figure 2C:
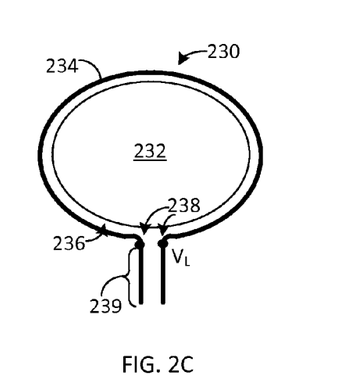

FIGS. 2A, 2B and 2C illustrate top views of example loop antenna-magnetic gain element geometric configurations 210, 220, 230 consistent with various embodiments of the present disclosure. The geometric configurations are shown for illustrative purposes. Other geometries may be used and are within the scope of the present disclosure. Geometric configuration 210 is generally circular. Geometric configuration 220 is generally rectangular and may include generally square geometric configurations and/or generally diamond geometric configurations where loop terminals 228 and transmission line 229 may be aligned with a corner of the diamond. Geometric configuration 230 is generally ellipsoidal. The loop axis of each geometric configuration 210, 220, 230 is out of the page.

Each geometric configuration 210, 220, 230 includes a respective magnetic gain element 212, 222, 232, positioned in an aperture (i.e., opening) defined by a respective loop antenna 214, 224, 234. In some embodiments, each loop antenna 214, 224, 234 may correspond to a respective conductor. In these embodiments, each magnetic gain element 212, 222, 232 may be separated from its respective loop antenna 214, 224, 234 by a respective insulator and/or dielectric 216, 226, 236. In some embodiments, each respective loop antenna 214, 224, 234 may include the respective insulator 216, 226, 236.

An area of each magnetic gain element 212, 222, 232 may be less than or equal to an area of the aperture defined by the respective loop antenna 214, 224, 234. For a loop antenna 214, 224, 234 that does not include the respective insulator 216, 226, 236 (i.e., includes the loop conductor), the area of the respective magnetic gain element 212, 222, 232 may be less than or equal to the area of the aperture with the difference corresponding to an area of the respective insulator 216, 226, 236. For example, the area of circular magnetic gain element 212 with radius $r_m$ is $\pi r_m^2$ and the area of the corresponding aperture is $\pi r_a^2$, where $r_a$ is a radius of the aperture (and corresponds to a radius of the loop conductor). In this example, a radial thickness of the insulator corresponds to a difference between $r_a$ and $r_m$. For example, the radial thickness may be in the range of zero to ten μm. For a loop antenna 214, 224, 234 that includes a respective insulator 216, 226, 236, the area of the respective magnetic gain element 212, 222, 232 may correspond to the area of the aperture. For loop antennas 214, 224, 234 that include a respective insulator 216, 226, 236, the radial thickness of the insulator 216, 226, 236 may be on the order of millimeters.

Each loop antenna 214, 224, 234 may less than completely enclose the respective aperture. Each loop antenna 216, 226, 236 may terminate at respective antenna terminals 218, 228, 238. For example, the respective terminals may be separated by an insulator. Loop output voltages, $V_L$, may be detected at the respective antenna terminals 218, 228, 238. In some embodiments, a transmission line 219, 229, 239 may be coupled to the respective loop antenna 214, 224, 234 at respective loop terminals 218, 228, 238. In some embodiments, the respective transmission line 219, 229, 239 and the respective loop antenna 214, 224, 234 may each be a portion of one elongate conductive element, e.g., may be included in a coaxial cable. In some embodiments, an amplifier, as will be described in more detail below, may be coupled to respective terminals, 218, 228, 238. In these embodiments, the respective transmission line 219, 229, 239 may be coupled to the amplifier.

For wide band operation, a circumference of each loop antenna 214, 224, 234 and a corresponding circumference of the respective magnetic gain element 212, 222, 232 are configured to be electrically small for frequencies within the operating range of the loop antenna. For example, the circumference of each loop antenna may be less than or equal to one tenth of a wavelength of an incident electromagnetic wave at a maximum operating frequency of the operating frequency range. In another example, the circumference of a loop antenna consistent with the present disclosure may be greater than one tenth of a wavelength of an incident electromagnetic wave at a maximum operating frequency of the operating frequency range. In this example, the size of the loop antenna may be increased to increase the antenna's output since the antenna's output is proportional to area. The loop antenna circumference may be greater than one tenth of a wavelength of an incident electromagnetic wave at a maximum operating frequency of the operating frequency range provided that the antenna does not exhibit resonant behavior. Thus, spatial variation of the received magnetic field over the loop area does not vary with frequency over a wide range of frequencies, and hence the antenna characteristics (notably radiation pattern) are similar over that frequency range. Such a magnetic field loop antenna may be considered a dual of a Hertzian dipole, electric field antenna.

The size of a loop antenna (i.e., loop circumference) consistent with the present disclosure may be determined based, at least in part, on a wavelength of a maximum operating frequency inside the magnetic gain element. Wavelength may be determined from $\lambda=v/f$, where v is propagation velocity inside the material in meters/second, f is frequency of the electromagnetic wave in cycles/second and λ is wavelength in meters. The propagation velocity in the material is proportional to the propagation velocity of an electromagnetic wave in a vacuum (i.e., $3\times10^8$ meters/sec) and depends on material properties including the relative permeability of the material. For example, for a low-loss magnetic material, the propagation velocity in the material is approximately equal to the propagation velocity of an electromagnetic wave in a vacuum divided by the square root of the relative permeability.

The magnetic gain element 110, that includes a magnetic material with relative permeability greater than one, is configured to facilitate a wide band operating frequency range of antenna system 102. In other words, for an incident magnetic field intensity, H, the induced loop output voltage for an antenna system consistent with the present disclosure is greater than the induced loop output voltage for a similar sized loop antenna without a magnetic material by a factor of $\mu_r$. Thus, the magnetic gain element 110 is configured to provide a permeability-induced gain over a frequency range in which the magnetic material has a relative permeability greater than one. The operating frequency range of an antenna system consistent with the present disclosure is related to and may correspond to the frequency range over which the magnetic material has a relative permeability greater than one.

Advantageously, an antenna system consistent with the present disclosure, i.e., with a relatively small form factor, may provide ease of mounting as well as mechanical robustness, particularly for mobile applications. A particular geometry may be selected based, at least in part, on space constraints associated with an antenna system's operational location. Since the induced voltage, $V_L$, depends, at least in part, on the area of a loop, the permeability-induced gain provided by the magnetic gain element facilitates generating a usable induced voltage from a loop with this form factor and, thus, wideband operation of an antenna system consistent with the present disclosure.

It is contemplated that an antenna system consistent with the present disclosure may be utilized as an electromagnetic probe. Electromagnetic probes, also known as near field probes, may be utilized to determine localized sources of electromagnetic radiation, typically interference. For example, electromagnetic interference may be generated by individual circuit components. In another example, electromagnetic interference may be generated as a result of trace routing on a printed circuit board. Identifying localized interference sources may facilitate reducing that interference by, for example, shielding a component or rerouting the traces.

Electromagnetic probes are generally small so that their response can be localized to the size of circuit components. It is contemplated that an antenna system consistent with the present disclosure, including a relatively small loop antenna and an associated magnetic gain element may be utilized as a magnetic field sensor. Such an antenna system may be relatively more sensitive and may need less amplification than a small loop antenna alone because of the permeability-induced gain provided by the magnetic element.

Figure 3:
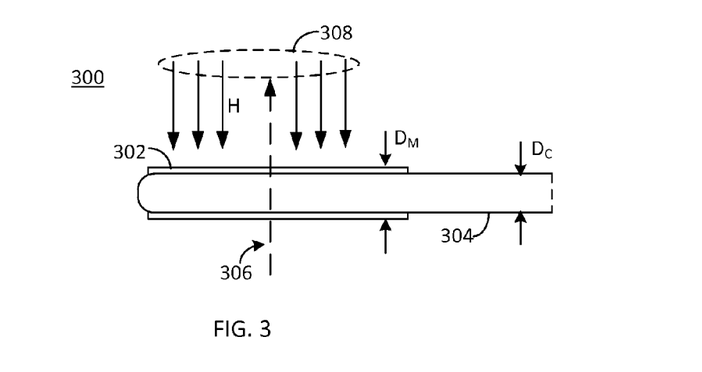
FIG. 3 illustrates a side view of an antenna system consistent with various embodiments of the present disclosure.

FIG. 3 illustrates a side view of an antenna system 300 consistent with various embodiments of the present disclosure. The antenna system 300 includes a magnetic gain element 302 and a loop antenna conductor 304. For example, antenna system 300 may correspond to antenna system 102, magnetic gain element 203 may correspond to magnetic gain element 110 and loop antenna conductor 304 may correspond to loop antenna 120. The axis of the antenna system 300 is illustrated by dotted arrow 306. Magnetic field lines 308 associated with incident magnetic field H are illustrated oriented substantially parallel to the axis of the antenna system. For example, the axis 306 may be substantially vertically oriented in order to capture the magnetic field of a horizontally polarized electromagnetic wave, as described herein. It should be noted that, in this example, when antenna system 300 is moving (i.e., is mobile), its orientation may deviate from vertical orientation so that the magnetic field lines 308 may sometimes be at an angle relative to the loop axis 306.

The loop antenna conductor 304 has a diameter $D_C$. The magnetic gain element 302 has a thickness $D_M$, measured in the direction of the loop axis 306. The magnetic gain element 302 may include a volume of magnetic material determined according to loop area, A (i.e., related to the area of the aperture defined by the loop antenna), multiplied by thickness, $D_M$. The thickness $D_M$ of the magnetic gain element 302 may generally be greater than or equal to the diameter $D_C$ of the loop antenna conductor 304. A magnetic gain element 302 thickness $D_M$ greater than loop antenna conductor 304 diameter $D_C$ is configured to expose the entire loop antenna conductor 304 to an electric field generated (i.e., induced) by the time varying magnetic flux density produced by the incident magnetic field. Fringing effects between the magnetic gain element 302 and the loop antenna conductor 304 may be minimized when $D_M$ is greater than or equal to $D_C$. Thicknesses $D_M$ of the magnetic gain element 302 less than the diameter $D_C$ of the loop antenna conductor 304 may provide relatively less permeability-induced gain than thicknesses $D_M$ greater than or equal to the diameter $D_C$ of the loop antenna conductor 304. If $D_M$ is reduced until $D_M$ approaches zero, the permeability-induced gain may also approach zero. On the other hand, if the magnetic gain element thickness $D_M$ is increased to relatively greater and greater than the loop antenna conductor diameter $D_C$, the magnetic gain element may provide a relatively smaller and smaller benefit related to permeability-induced gain until the additional benefit goes to (i.e., asymptotes to) zero. Thus, adding more magnetic material may provide no additional benefit in permeability-induced gain and may increase cost, size, weight and/or manufacturing complexity.

In some embodiments, magnetic gain element 302 thickness $D_M$ may vary over an area A of the magnetic gain element 302. For example, thickness $D_M$ may decrease to a minimum near the axis 306 of the loop antenna conductor 304, i.e., the magnetic gain element 302 may be concave. In another example, thickness $D_M$ may increase to a maximum near the axis 306 of the loop antenna conductor 304, i.e., the magnetic gain element 302 may be convex.

Turning again to FIG. 1, in some embodiments, the antenna system 102 may include an amplifier 130 coupled to the loop antenna 120. The amplifier 130 may be configured to amplify the loop output voltage, $V_L$ or a loop current related to loop output voltage $V_L$. The amplifier 130 may be configured to provide an impedance matched output of the antenna system 102 to a transmission line 150 configured to couple the antenna system 102 to the receiver 140. For example, the amplifier 130 may be a pre-amplifier. In some embodiments, the pre-amplifier may be a low noise pre-amplifier configured to receive a relatively low level loop output voltage and to amplify the received loop output voltage without introducing excessive noise. In another example, the amplifier 130 may be a current amplifier configured to amplify the loop output current. The amplifier 130 may be physically located near the loop antenna 120. For example, the amplifier 130 may be positioned adjacent and/or between the loop antenna 120 output terminals, e.g., antenna terminals 218, 228 or 238 of FIG. 2. Positioning the amplifier physically near the loop antenna output terminals is configured to reduce effects of noise and/or interference and to facilitate a better match between the loop antenna 120 output impedance and the amplifier 130 input impedance.

In some embodiments, an antenna system, e.g., antenna system 102, may be included in an enclosure. The enclosure may be configured to protect the antenna system 102 from various environmental conditions. The enclosure may be further configured to facilitate mounting the antenna system 102 to a vehicle and/or mobile device. The enclosure may be formed of a relatively low permittivity material to facilitate coupling the loop antenna 120 to free space. In some embodiments, the antenna system 102 may be mounted and/or secured in the enclosure using a "potting" material. Similar to the enclosure material, the potting material may have a relatively low permittivity. The enclosure is configured to be mounted such that the loop antenna axis is substantially vertical, thus facilitating an isotropic field pattern in the azimuthal plane.

Thus, antenna system 102 is configured to receive an incident electromagnetic wave, capture a magnetic-field component associated with the incident electromagnetic wave and to increase the magnetic flux density associated with the captured magnetic-field component. The antenna system 102 is configured to generate a loop electrical output voltage using loop antenna 120 based, at least in part, on the increased magnetic flux density and to provide an electrical signal related to the loop output voltage to the receiver. In some embodiments, the loop output voltage may be provided to an amplifier configured to amplify the loop output voltage and/or impedance match the antenna system to a transmission line configured to couple the antenna system to the receiver.

Figure 4A:
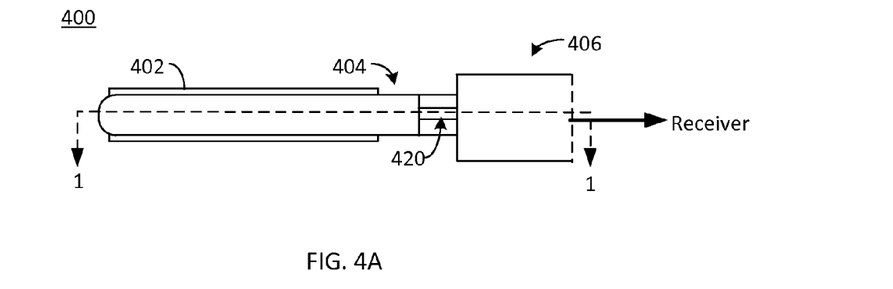
FIG. 4A illustrates a side view of one embodiment of an antenna system consistent with the present disclosure.
Figure 4B:
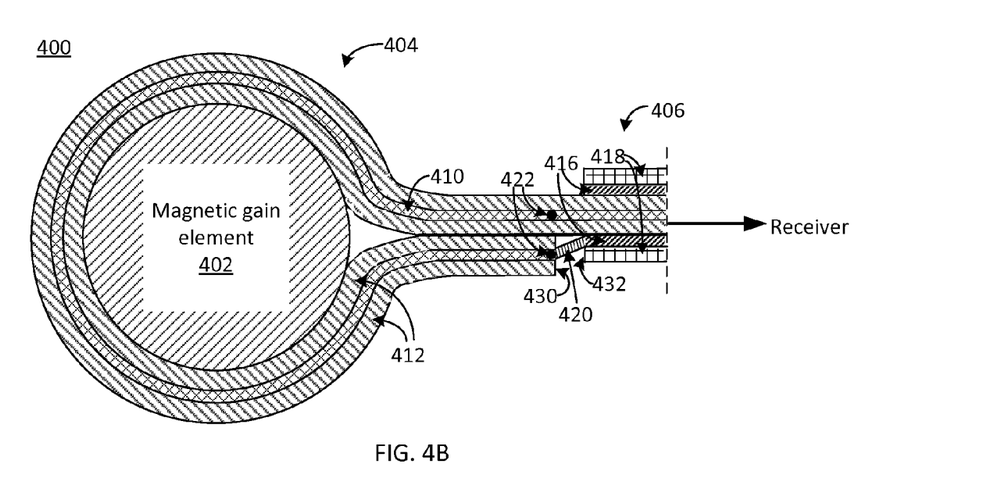
FIG. 4B illustrates a cross-section of the embodiment of the antenna system shown in FIG. 4A.

FIG. 4A illustrates a side view of one embodiment of an antenna system 400 consistent with the present disclosure. FIG. 4A further illustrates a perspective of a cross-section 1-1 that is illustrated in FIG. 4B. In FIGS. 4A and 4B, like elements have like reference designators. It should be noted that the perspective of the cross-section 1-1 of FIG. 4B corresponds to the perspectives of FIGS. 2A, 2B and 2C. Antenna system 400 includes a magnetic gain element 402 and a loop antenna 404. The magnetic gain element 402 is positioned in an aperture defined by the loop antenna 404. The loop antenna 404 is formed of a coaxial cable 406. The coaxial cable 406 includes the loop antenna 404 and a transmission line coupling the antenna system 400 to a receiver. The coaxial cable 406 is configured as an elongate member that couples antenna system 400 to the receiver. In this embodiment, a coupling 420 is configured to couple a loop antenna conductor (e.g., the coaxial cable center conductor) to the coaxial cable outer conductor as will be described in more detail below.

FIG. 4B illustrates a cross-section of the antenna system 400 shown in FIG. 4A. Antenna system 400 includes the magnetic gain element 402 positioned in the aperture defined by the loop antenna 404. The coaxial cable 406 is configured as an elongate member that couples antenna system 400 to the receiver. The coaxial cable 406 includes a center conductor 410, a dielectric layer 412, and outer conductor 416 and an outer layer 418. The center conductor 410, dielectric layer 412, outer conductor 416 and outer layer 418 are concentric layers that form the coaxial cable 406. The loop antenna 404 includes the center conductor 410 and dielectric layer 412 that encircle the magnetic gain element 402. In this embodiment, the dielectric layer 412 corresponds to an insulating layer between the antenna conductor and the magnetic gain element 402.

The loop antenna 404 may be formed from coaxial cable 406 by removing the outer layer and outer conductor of a length of the coaxial cable (from a first end 430 to a second end 432) sufficient to encircle the magnetic gain element 402. The loop antenna 404 may then be wrapped circumferentially around the magnetic gain element 402 and the first end 430 may be positioned near the second end 432. An end of center conductor 410 corresponding to the first end 430 of the coaxial cable 406 may be coupled to an end of outer conductor 416 corresponding to the second end 432 of coaxial cable by coupling 420. In some embodiments, center conductor 410 may be connected to the outer conductor 416 without a coupling. For example, center conductor 410 may be soldered to outer conductor 416. In this example, element 420 may correspond to a portion of center conductor 410. Loop output voltage $V_L$ may be captured at antenna terminals 422 coupled to the center conductor 410 at or near the first end 430 and the second end 432. In some embodiments, at least a portion of loop antenna 404 may be attached to magnetic gain element 402 by, e.g., an adhesive. Thus, a loop antenna consistent with the present disclosure may be formed using a coaxial cable.

Figure 5:
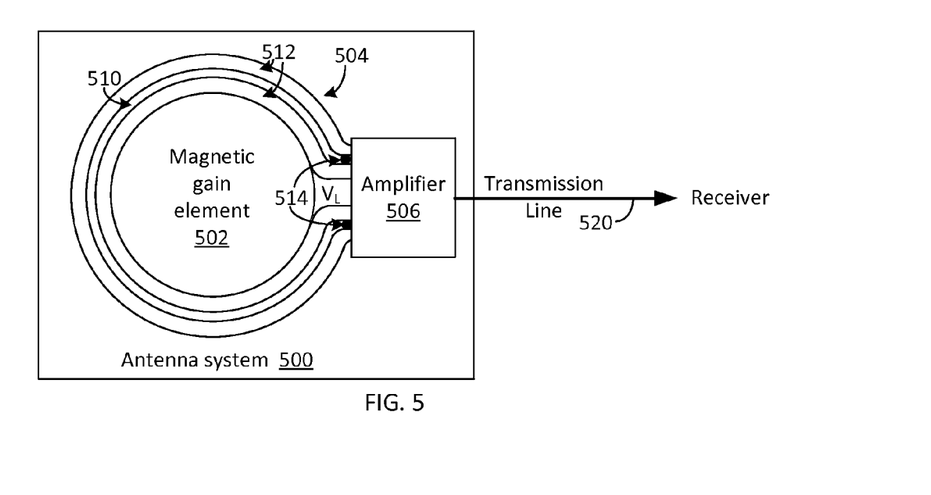
FIG. 5 illustrates an example antenna system that includes an amplifier consistent with one embodiment of the present disclosure.

FIG. 5 illustrates an example antenna system 500 that includes an amplifier 506 coupled to a transmission line 520 consistent with one embodiment of the present disclosure. The antenna system 500 includes a magnetic gain element 502 positioned in an aperture defined by a loop antenna 504. The loop antenna 504 is coupled to an input of the amplifier 506. An output of the amplifier 506 is coupled to the transmission line 520. The loop antenna 504 includes a conductor 510 and an insulating and/or dielectric layer 512. The loop antenna 504 encircles the magnetic gain element 502. The loop antenna 504, via conductor 510, is coupled to an input of the amplifier 506 at loop antenna terminals 514. The amplifier 506 may be configured to amplify a loop antenna electrical output (e.g., loop antenna voltage or loop current related to the loop antenna voltage) and/or provide impedance matching to the transmission line, as described herein. The amplifier 506 is configured to provide the amplified loop antenna electrical output to a receiver via transmission line 520.

The amplifier is positioned relatively close to loop antenna 504 in order to minimize noise and/or interference. Positioning the amplifier close to the loop antenna is configured to amplify only the signals captured by the loop antenna. If the amplifier is not positioned near the loop antenna, the wires connecting the loop antenna to the amplifier may act like antennas themselves and may capture undesired interference. The wires may also act like a transmission line and will add losses due to mismatch between the loop and that transmission line. By placing the preamplifier at the loop terminals, such mismatch effects may be minimized by properly designing the input impedance of the amplifier. For example, the amplifier may be configured with a relatively high input impedance and be configured to amplify the loop antenna output voltage. In another example, the amplifier may be configured with a relatively low input impedance and be configured to amplify the loop antenna current (the current related to the loop antenna output voltage).

Thus, various embodiments of a magnetic field antenna system have been described herein. The antenna system includes a magnetic gain element positioned in an aperture defined by a loop antenna. In some embodiments, the antenna system includes an amplifier coupled to the loop antenna at loop antenna terminals. The magnetic gain element includes a magnetic material with a relative permeability greater than one, configured to provide permeability-induced gain to the antenna system over an operating frequency range. The loop antenna is configured to have a circumference that is electrically small. The magnetic gain element and loop antenna are configured to provide wide band operation of the antenna system (e.g., operating bandwidth of 50 MHz to 1 GHz, including the VHF band and the UHF band). In some embodiments, the antenna system is configured to be mounted so that the loop antenna axis is substantially vertical (i.e., vertical to within a tolerance) thus facilitating capture of the magnetic-field component of a horizontally polarized electromagnetic wave and an isotropic field pattern in the azimuthal plane.

Figure 6:
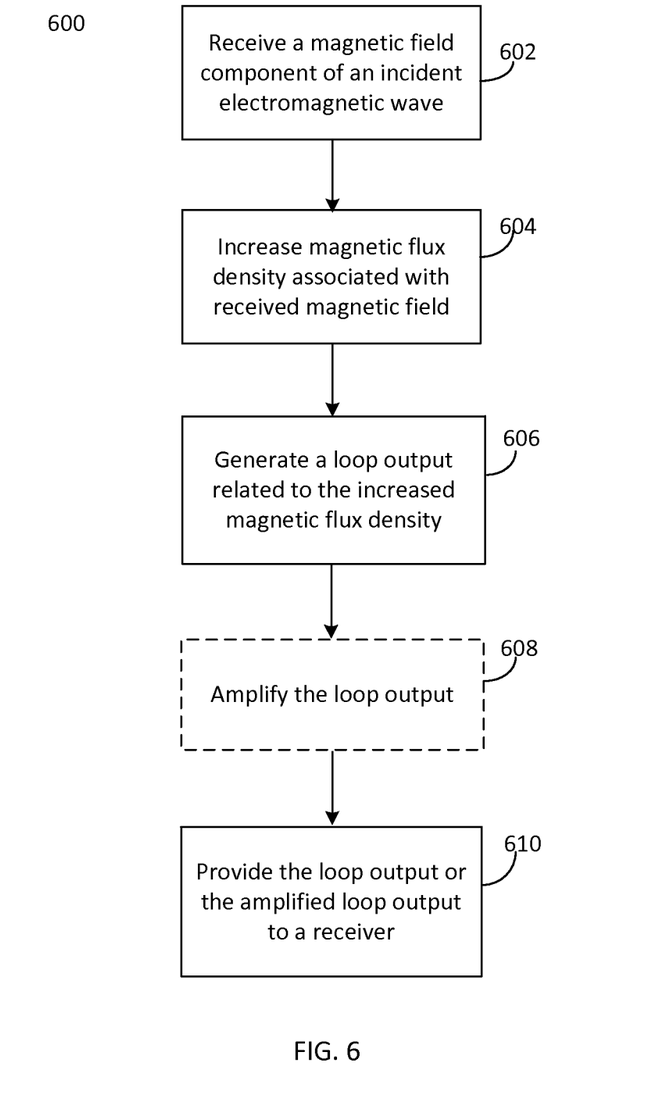
FIG. 6 illustrates a flowchart of exemplary operations for receiving a magnetic field consistent with various embodiments of the present disclosure.

FIG. 6 illustrates a flowchart 600 of exemplary operations for receiving a magnetic field consistent with various embodiments of the present disclosure. The operations of flowchart 600 may be performed, for example, by antenna system 102 including magnetic gain element 110 and loop antenna 120 of FIG. 1. It is assumed that a transmitting system is transmitting an electromagnetic wave in the operating frequency range of the antenna system and that the antenna system (i.e., receive antenna) is oriented to couple with the magnetic-field component of the electromagnetic wave. For example, the transmitted electromagnetic wave may correspond to a digital television signal. In another example, the transmitted electromagnetic wave may include a Datacast signal. In these examples, the transmitted electromagnetic wave may be horizontally polarized and the receive antenna may be vertically oriented to couple with the magnetic-field component of the electromagnetic wave.

Operation 602 includes receiving a magnetic-field component of an incident electromagnetic wave. The magnetic-field component corresponds to a magnetic-field component of the transmitted electromagnetic wave. For example, the incident magnetic field intensity may be received by a magnetic gain element. A magnetic flux density associated with the received magnetic field may be increased at operation 604. For example, the magnetic gain element may include magnetic material that has a relative permeability greater than one over an operating frequency range of the antenna system, as described herein.

Operation 606 includes generating a loop output. The loop output may be generated by the loop antenna (i.e., induced in the loop antenna) based, at least in part, on the increased magnetic flux density. In some embodiments, the loop output may be amplified at operation 608. For example, an amplifier positioned relatively near the loop antenna, may be configured to amplify the loop output. The loop output may be a loop output voltage or a loop output current related to the loop output voltage. The amplifier may be further configured to provide impedance matching of the loop antenna system to a transmission line characteristic impedance, the transmission line configured to couple the loop antenna system to a receiver. Operation 610 includes providing the loop output (or amplified loop output) to a receiver. Thus, the magnetic-field component of an incident electromagnetic wave may be received by an antenna system consistent with the present disclosure.

An antenna system consistent with the present disclosure ("Kentenna") was constructed and its operation was compared to off-the-shelf antennas including two vertically-oriented electric field antennas ("VHF whip" and "UHF whip") without pre-amplifiers and a horizontally-oriented electric field antenna ("RV antenna") that included a pre-amplifier with an unspecified gain. VHF whip is configured to capture electric-field components of electromagnetic waves in the VHF frequency band (i.e., 54 MHz to 216 MHz) and UHF whip is configured to capture electric-field components of electromagnetic waves in the UHF frequency band (i.e., 470 MHz to 890 MHz). RV antenna is configured to electric-field components of electromagnetic waves in the FM, VHF and UHF frequency bands (i.e., 54 MHz to 890 MHz).

The Kentenna was configured generally according to the example antenna system 400 illustrated herein in FIGS. 4A and 4B, including a loop antenna formed of an RG-58 coaxial cable and a magnetic gain element obtained from Fair-rite Products Corp., Wallkill, N.Y. that included a magnetic material understood to have a relative permeability greater than one over at least the UHF frequency band. The magnetic gain element had a thickness of approximately 0.3 inches and a diameter of approximately 0.95 inches. The Kentenna was coupled to a 25 dB pre-amplifier via the coaxial cable.

Test measurements were performed in two locations within the coverage area of a VHF television source (Channel 11, 198 MHz to 204 MHz) that transmits both vertically and horizontally polarized electromagnetic waves and one location within the coverage area of a UHF television source (Channel 49, 680 MHz to 686 MHz) that radiates only a horizontally polarized electromagnetic wave. Data was collected with the antennas mounted on a vehicle in each of two positions on the vehicle: vehicle roof ("top") and vehicle trunk lid ("trunk"). Signal levels were detected using a Sencore DTV receiver. Signal levels are indicated in decibels above a millivolt (dBmV). Average signal levels for each antenna at each location are included in Tables 1, 2 and 3.

Table 1 illustrates average signal level data for antennas positioned at a first location within the coverage area of the VHF television source.

TABLE 1

| Antenna | Top | Trunk |
| --- | --- | --- |
| VHF Whip | −3.5 dBmV | −5 dBmV |
| UHF Whip | −23 | −26 |
| Kentenna | −4 | −2 |
| RV Antenna | −3 | −3 |

Table 2 illustrates average signal level data for antennas positioned at a second location within the coverage area of the VHF television source.

TABLE 2

| Antenna | Top | Trunk |
| --- | --- | --- |
| VHF Whip | −8 dBmV | −5 dBmV |
| UHF Whip | −26 | −24 |
| Kentenna | −4 | +2 |
| RV Antenna | +1 | +4 |

Table 3 illustrates average signal level data for antennas positioned within the coverage area of the UHF television source.

TABLE 3

| Antenna | Top | Trunk |
| --- | --- | --- |
| VHF Whip | −30 dBmV | −5 dBmV |
| UHF Whip | −24.5 | −25 |
| Kentenna | −8.5 | −5 |
| RV Antenna | −7 | −7 |

As illustrated by Tables 1, 2 and 3, an antenna system consistent with the present disclosure was able to receive digital television signals in both the UHF and VHF frequency bands.

Thus, a high frequency magnetic field antenna system has been described. The antenna system includes a loop antenna defining an aperture and a magnetic gain element positioned in the aperture. The antenna system may include an amplifier. The magnetic gain element includes a magnetic material that has a relative permeability greater than one over the operating frequency range of the antenna system. The operating frequency range has a minimum operating frequency of at least 50 MHz. A circumference of the loop antenna is configured to be electrically small, thereby providing wide band operation.

The antenna system is configured to receive a magnetic-field component of an incident electromagnetic wave. Thus, an antenna system consistent with the present disclosure is configured to provide high frequency, wide band operation and to have an isotropic field pattern in at least one plane. The antenna system is further configured to have a relatively small form factor that may facilitate mounting and use in a mobile environment.

According to one aspect, there is provided an antenna system. The antenna system includes a loop antenna including a conductor; and a magnetic gain element positioned in an aperture defined by the loop antenna, the magnetic gain element including a magnetic material that has a relative permeability greater than one for an operating frequency range, the magnetic gain element configured to increase a magnetic flux density associated with a received magnetic-field component of an incident electromagnetic wave wherein a loop output voltage induced in the loop antenna is based, at least in part, on the increased magnetic flux density.

Another example antenna system includes the forgoing components and further includes an amplifier coupled to the loop antenna, the amplifier configured to at least one of amplify the loop output voltage, amplify a loop output current related to the loop output voltage or provide an output impedance corresponding to a characteristic impedance of a transmission line configured to couple the antenna system to a receiver.

Another example antenna system includes the forgoing components and the amplifier is positioned adjacent to loop antenna terminals.

Another example antenna system includes the forgoing components and the operating frequency range has a minimum operating frequency greater than or equal to 50 Megahertz (MHz).

Another example antenna system includes the forgoing components and the incident electromagnetic wave is horizontally polarized, a loop axis of the loop antenna is vertically oriented and the operating frequency range is 54 MHz (megahertz) to 890 MHz.

Another example antenna system includes the forgoing components and a circumference of the loop antenna is less than or equal to one tenth of a wavelength of a maximum operating frequency of the antenna system.

Another example antenna system includes the forgoing components and a thickness of the magnetic gain element is greater than or equal to a diameter of the conductor.

According to another aspect there is provided a method. The method includes increasing a magnetic flux density associated with a received magnetic-field component of an incident electromagnetic wave using a magnetic gain element positioned in an aperture defined by a loop antenna, the magnetic gain element comprising a magnetic material that has a relative permeability greater than one for an operating frequency range; and inducing a loop output voltage in the loop antenna based, at least in part, on the increased magnetic flux density.

Another example method includes the foregoing operations and further includes at least one of amplifying the loop output voltage or amplifying a loop output current related to the loop output voltage using an amplifier coupled to the loop antenna.

Another example method includes the foregoing operations and a minimum operating frequency is greater than or equal to 50 MHz (megahertz).

Another example method includes the foregoing operations and the incident electromagnetic wave is horizontally polarized, a loop axis of the loop antenna is vertically oriented and the operating frequency range is 54 MHz (megahertz) to 890 MHz.

Another example method includes the foregoing operations and a circumference of the loop antenna is less than or equal to one tenth of a wavelength of a maximum operating frequency of the antenna system.

Another example method includes the foregoing operations and further includes providing an output signal related to the loop output voltage to a receiver coupled to the loop antenna.

According to another aspect there is provided a system. The system includes a receiver coupled to an antenna system. The antenna system includes a loop antenna including a conductor, and a magnetic gain element positioned in an aperture defined by the loop antenna, the magnetic gain element including a magnetic material that has a relative permeability greater than one for an operating frequency range, the magnetic gain element configured to increase a magnetic flux density associated with a received magnetic-field component of an incident electromagnetic wave, wherein a loop output voltage induced in the loop antenna is based, at least in part, on the increased magnetic flux density and the receiver is configured to receive an input signal related to the loop output voltage.

Another example system includes the forgoing components and the antenna system further includes an amplifier coupled to the loop antenna, the amplifier configured to at least one of amplify the loop output voltage, amplify a loop output current related to the loop output voltage or provide an output impedance corresponding to a characteristic impedance of a transmission line configured to couple the antenna system to the receiver.

Another example system includes the forgoing components and the amplifier is positioned adjacent to loop antenna terminals.

Another example system includes the forgoing components and the operating frequency range has a minimum operating frequency of greater than or equal to Megahertz (MHz).

Another example system includes the forgoing components and the incident electromagnetic wave is horizontally polarized, a loop axis of the loop antenna is vertically oriented and the operating frequency range is 54 MHz (megahertz) to 890 MHz.

Another example system includes the forgoing components and a circumference of the loop antenna is less than or equal to one tenth of a wavelength of a maximum operating frequency of the antenna system.

Another example system includes the forgoing components and the a thickness of the magnetic gain element is greater than or equal to a diameter of the conductor.

Although illustrative embodiments and methods have been shown and described, a wide range of modifications, changes, and substitutions is contemplated in the foregoing disclosure and in some instances some features of the embodiments or steps of the method may be employed without a corresponding use of other features or steps. Accordingly, it is appropriate that the claims be construed broadly and in a manner consistent with the scope of the embodiments disclosed herein.

What is claimed is:

1. An antenna system comprising:
    a loop antenna comprising a conductor; and
    a magnetic gain element positioned in an aperture defined by the loop antenna, the magnetic gain element comprising a magnetic material that has a relative permeability greater than one for an operating frequency range, the magnetic gain element configured to increase a magnetic flux density associated with a received magnetic-field component of an incident electromagnetic wave wherein a loop output voltage induced in the loop antenna is based, at least in part, on the increased magnetic flux density,
    wherein the incident electromagnetic wave is horizontally polarized, a loop axis of the loop antenna is vertically oriented and the operating frequency range is 54 MHz (megahertz) to 890 MHz.

2. The antenna system of claim 1, further comprising an amplifier coupled to the loop antenna, the amplifier configured to at least one of amplify the loop output voltage, amplify a loop output current related to the loop output voltage or provide an output impedance corresponding to a characteristic impedance of a transmission line configured to couple the antenna system to a receiver.

3. The antenna system of claim 2, wherein the amplifier is positioned adjacent to loop antenna terminals.

4. The antenna system of claim 1, wherein a circumference of the loop antenna is less than or equal to one tenth of a wavelength of a maximum operating frequency of the antenna system.

5. The antenna system of claim 1, wherein a thickness of the magnetic gain element is greater than or equal to a diameter of the conductor.

6. A method comprising:
    increasing a magnetic flux density associated with a received magnetic-field component of an incident electromagnetic wave using a magnetic gain element positioned in an aperture defined by a loop antenna, the magnetic gain element comprising a magnetic material that has a relative permeability greater than one for an operating frequency range; and inducing a loop output voltage in the loop antenna based, at least in part, on the increased magnetic flux density, wherein the incident electromagnetic wave is horizontally polarized, a loop axis of the loop antenna is vertically oriented and the operating frequency range is 54 MHz (megahertz) to 890 MHz.

7. The method of claim 6, further comprising at least one of amplifying the loop output voltage or amplifying a loop output current related to the loop output voltage using an amplifier coupled to the loop antenna.

8. The method of claim 6, wherein a circumference of the loop antenna is less than or equal to one tenth of a wavelength of a maximum operating frequency of the antenna system.

9. The method of claim 6, further comprising providing an output signal related to the loop output voltage to a receiver coupled to the loop antenna.

10. A system comprising:

a receiver; and an antenna system coupled to the receiver, the antenna system comprising a loop antenna comprising a conductor, and a magnetic gain element positioned in an aperture defined by the loop antenna, the magnetic gain element comprising a magnetic material that has a relative permeability greater than one for an operating frequency range, the magnetic gain element configured to increase a magnetic flux density associated with a received magnetic-field component of an incident electromagnetic wave, wherein the incident electromagnetic wave is horizontally polarized, a loop axis of the loop antenna is vertically oriented and the operating frequency range is 54 MHz (megahertz) to 890 MHz, wherein a loop output voltage induced in the loop antenna is based, at least in part, on the increased magnetic flux density and the receiver is configured to receive an input signal related to the loop output voltage.

11. The system of claim 10, wherein the antenna system further comprises an amplifier coupled to the loop antenna, the amplifier configured to at least one of amplify the loop output voltage, amplify a loop output current related to the loop output voltage or provide an output impedance corresponding to a characteristic impedance of a transmission line configured to couple the antenna system to the receiver.

12. The system of claim 11, wherein the amplifier is positioned adjacent to loop antenna terminals.

13. The system of claim 10, wherein a circumference of the loop antenna is less than or equal to one tenth of a wavelength of a maximum operating frequency of the antenna system.

14. The system of claim 10, wherein a thickness of the magnetic gain element is greater than or equal to a diameter of the conductor.

\* \* \* \* \*